(12) United States Patent
Vacek et al.

(10) Patent No.: US 12,008,668 B2
(45) Date of Patent: Jun. 11, 2024

(54) SYSTEMS AND METHODS FOR DETERMINING STRUCTURED PROCEEDING OUTCOMES

(71) Applicant: Thomson Reuters Enterprise Centre GmbH, Zug (CH)

(72) Inventors: Thomas Vacek, Minneapolis, MN (US); Dezhao Song, Eagan, MN (US); Tim Nugent, London (GB); Conner Cowling, St. Louis Park, MN (US); Ronald Teo, Inver Grove Heights, MN (US); Frank Schilder, St. Paul, MN (US)

(73) Assignee: Thomson Reuters Enterprise Centre GmbH, Zug (CH)

( * ) Notice: Subject to any disclaimer, the term of this patent is extended or adjusted under 35 U.S.C. 154(b) by 0 days.

(21) Appl. No.: 18/102,760

(22) Filed: Jan. 29, 2023

(65) Prior Publication Data
US 2023/0177626 A1    Jun. 8, 2023

Related U.S. Application Data

(63) Continuation of application No. 16/446,423, filed on Jun. 19, 2019, now Pat. No. 11,568,503.
(Continued)

(51) Int. Cl.
*G06Q 50/18* (2012.01)
*G06N 3/08* (2023.01)

(52) U.S. Cl.
CPC .............. *G06Q 50/18* (2013.01); *G06N 3/08* (2013.01)

(58) Field of Classification Search
CPC .......... G06Q 50/18; G06Q 10/10; G06N 3/08; G06N 3/02; G06N 3/04; G06N 3/042;
(Continued)

(56) References Cited

U.S. PATENT DOCUMENTS 9,552,548 B1    1/2017  Brestoff
9,579,397 B1    2/2017  Towell et al.
(Continued)

OTHER PUBLICATIONS

V. Raghupathi, Y. Zhou and W. Raghupathi, "Legal Decision Support: Exploring Big Data Analytics Approach to Modeling Pharma Patent Validity Cases," (2018), IEEE Access, vol. 6, pp. 1-11. (Year: 2018).*

(Continued)

*Primary Examiner* — Sarah M Monfeldt
*Assistant Examiner* — Michael J. Monaghan
(74) *Attorney, Agent, or Firm* — Norton Rose Fulbright US LLP

(57) ABSTRACT

The present disclosure relates to systems and methods for analyzing and extracting data related to a structured proceeding, and for identifying, based on the analysis, at least one outcome associated with the structured proceeding. Embodiments provide for receiving data associated with a structured proceeding involving at least one party, the data including at least one docket entry, and analyzing, by an outcome location detector, the data to identify one or more docket entries in the at least one docket entry that are likely to include evidence of an outcome. Embodiments further include analyzing, by an outcome detector, the one or more docket entries determined to be likely to include evidence of an outcome to determine outcomes. The outcomes include at least one of a final outcome and at least one party outcome. The final outcome is associated with the structured proceeding overall, and the at least one party outcome is associated with a party of the at least one party that may have been terminated early.

20 Claims, 6 Drawing Sheets

Related U.S. Application Data

(60) Provisional application No. 62/686,805, filed on Jun. 19, 2018.

(58) Field of Classification Search
CPC ...... G06N 3/044; G06N 3/0442; G06F 16/35; G06F 16/93; G06F 2216/03; G06F 16/248
See application file for complete search history.

(56) References Cited

U.S. PATENT DOCUMENTS

| | | |
|---|---|---|
| 10,133,791 B1 | 11/2018 | Chan |
| 2010/0125601 A1 | 5/2010 | Jackson et al. |
| 2011/0119198 A1 | 5/2011 | Courson et al. |
| 2012/0215727 A1 | 8/2012 | Malik et al. |
| 2012/0317042 A1 | 12/2012 | Rhoads et al. |
| 2016/0140210 A1 | 5/2016 | Pendyala et al. |
| 2016/0275414 A1* | 9/2016 | Towal ............... G06F 18/214 |
| 2016/0314146 A1 | 10/2016 | Carothers et al. |
| 2016/0314549 A1 | 10/2016 | Carothers et al. |
| 2017/0076001 A1 | 3/2017 | Salas et al. |
| 2017/0270100 A1* | 9/2017 | Audhkhasi ............ G06F 40/289 |
| 2017/0270115 A1 | 9/2017 | Cormack et al. |
| 2017/0364827 A1 | 12/2017 | Conrad et al. |
| 2018/0082389 A1 | 3/2018 | Guggilla et al. |
| 2018/0225553 A1 | 8/2018 | Ha et al. |
| 2018/0300400 A1* | 10/2018 | Paulus ................ G06N 3/044 |
| 2019/0278835 A1* | 9/2019 | Cohan .................. G06F 40/289 |
| 2020/0012919 A1* | 1/2020 | Bathaee ................ G06N 20/10 |

OTHER PUBLICATIONS

Yang, Z. et al, "Hierarchical Attention Networks for Document Classification," Proceedings of NAACL-HLT, San Diego, California, Jun. 12-17, 2016, pp. 1480-1489, Association for Computational Linguistics.

International Search Report and Written Opinion issued for PCT Application No. PCT/IB2019/055188, dated Feb. 28, 2020, 8 pages.

Goldberg, Yoav. "A Primer on Neural Network Models for Natural Language Processing," 2016, Journal of Artificial Intelligence Research 57, pp. 345-420. (Year: 2016).

Y. Yang, P. A. Fasching and V. Tresp, "Predictive Modeling of Therapy Decisions in Metastatic Breast Cancer with Recurrent Neural Network Encoder and Multinomial Hierarchical Regression Decoder," 2017, 2017 IEEE International Conference on Healthcare Informatics (ICHI), pp. 46-55 (Year: 2017).

T. Young, D. Hazarika, S. Poria and E. Cambria, "Recent Trends in Deep Learning Based Natural Language Processing [Review Article]", Aug. 9, 2017, arXiv:1708.02709v1 [cs.CL], pp. 1-21 (Year: 2017).

\* cited by examiner

SYSTEMS AND METHODS FOR DETERMINING STRUCTURED PROCEEDING OUTCOMES

CROSS-REFERENCE TO RELATED APPLICATION

The present application is a continuation of U.S. patent application Ser. No. 16/446,423, filed Jun. 19, 2019, and entitled "SYSTEMS AND METHODS FOR DETERMINING STRUCTURED PROCEEDING OUTCOMES," which claims priority to U.S. Provisional Application No. 62/686,805, filed Jun. 19, 2018, and entitled, "SYSTEMS AND METHODS FOR DETERMINING CASE PARTY OUTCOMES," the disclosures of which are incorporated by reference herein in their entirety.

TECHNICAL FIELD

The present subject matter is directed generally to data identification, and more particularly to identifying outcomes associated with a structured proceeding.

BACKGROUND

In any field, information about decisions, dispositions, and/or outcomes related to activities (e.g., cases and/or projects) is of great importance. This is especially true in docket research and management systems, such as systems for researching court dockets. Information about court cases is stored in court docket systems, and this information may include a large amount of data including documents, dispositions, motions, decisions, etc. The various docket entries in a court system, and the information within it, may be used to determine whether an outcome has occurred. The outcome may be a decision related to the case, such as a dismissal, settlement, summary judgement, decision, etc. However, because of the amount of data in the docket systems, and because these court systems do not necessarily index the information within the docket and the docket entries, identifying an outcome from the data and its taxonomy is very challenging. In addition, individual docket entries may not clearly and explicitly state that an outcome has occurred, and ascertaining that a particular docket entry is associated with an outcome may have to be done manually and may be difficult. Even when a docket outcome is known, identifying where in the docket, and/or in which docket entry, the outcome occurred is difficult. Some solutions have been proposed to address these challenges.

In some solutions, automated systems may use a rules-based approach to determine docket outcomes. However, such an approach is basic and formulaic, and may be limited by the constraints of the rules, which means it may not be very adaptable and may be difficult to scale. In these systems, the process is significantly manual, in order to identify and develop the rules that may be applied to determine docket outcomes. Additionally, these systems provide no granularity to the outcomes in relation to individual parties. For example, these systems do not provide any mechanisms to identify dispositions for individual parties, such as an early termination for a party that is dismissed from the case prior to the docket outcome.

SUMMARY

The present application relates to systems and methods for analyzing and extracting data related to a structured proceeding, and for identifying, based on the analysis, at least one outcome associated with the structured proceeding. In aspects, confidence scores may be calculated and provided with the outcomes indicating a likelihood that the identified outcome is accurate. The outcomes identified may include an overall outcome (also referred herein to as a final outcome), and/or individual party outcomes. For example, systems implemented in accordance with the present disclosure may provide mechanisms for identifying a docket final outcome, and/or party outcomes. A docket may include docket entries with information related to the structured proceeding. The techniques disclosed herein may include a machine learning based approach that may extract data from dockets entries, generate features from the extracted data, and use classifiers to identify docket final outcomes and party outcomes based on the data in the docket entries.

It is noted that as used herein, a "structured proceeding" may refer to any proceeding, proceedings, events, and/or series of events or activities that follow particular procedure, involving at least one party. For example, a structured proceeding may include a court proceeding in a case. In this instance, the court proceeding may follow a formal procedure, with various actions and events (e.g., motions, hearings, filings, decisions, etc.) associated with the case and involving at least one party (e.g., plaintiff, defendant, co-defendant, etc.). The events and materials associated with a court proceeding may be included in a docket, which may include docket entries associated with the various events. Although the discussion that follows focuses on a court proceeding and a docket of the court proceeding, the features and functionality discussed herein are also applicable to implementations involving other types of structured proceedings, e.g., project management, mergers and acquisitions, etc. As such, the functionality discussed herein may be applied to systems utilized to identify outcomes for any series of events, for individual events, for associated parties, etc., based on information associated with the proceedings. Therefore, the discussion that follows with respect to court dockets and associated docket entries should not be construed as limiting in any way.

As used herein, an outcome may refer to a result, decision, and/or disposition affecting the overall proceeding and/or a particular party or parties. In the particular example of a court proceeding, an outcome may include dismissal by motion, dismissal without a motion (including agreed dismissals), settlement, default judgment, summary judgment verdict (including jury verdicts and judgments from bench trials), transfer, consolidation, remand, etc. The verdict bucket can be further distinguished by jury.

As noted above, a structured proceeding may include at least one party associated with the proceeding, and the structured proceeding may result in an outcome. The various events included in the structured proceeding may include information. The information in the various docket entries may be related to the overall outcome, and/or may be related to party outcomes. For example, the information in the docket entries may be related to an overall outcome (e.g., a settlement, dismissal, decision, appeal decision, remand, etc.), or may be related to a party outcome (e.g., a settlement, dismissal, default judgment, summary judgment, etc.).

In one particular embodiment, a method includes receiving data associated with a structured proceeding involving at least one party, the data including at least one docket entry, and analyzing, by an outcome location detector, the data to identify one or more docket entries in the at least one docket entry that are likely to include evidence of an outcome. The method further includes analyzing, by an outcome detector, the one or more docket entries determined to be likely to include evidence of an outcome to determine outcomes. The outcomes include at least one of a final outcome and at least one of a party outcome. The final outcome is associated with the structured proceeding overall, and the at least one party outcome is associated with a party of the at least one party that may have been terminated early.

In another embodiment, a system may be provided. The system may include an outcome location detector configured to receive data associated with a structured proceeding involving at least one party, the data including at least one docket entry, and to analyze the data to identify one or more docket entries in the at least one docket entry that are likely to include evidence of an outcome. The system may also include an outcome detector configured to analyze the one or more docket entries determined to be likely to include evidence of an outcome to determine at least one of a final outcome and at least one party outcome. The final outcome is associated with the structured proceeding overall, and the at least one party outcome is associated with a party of the at least one party.

In yet another embodiment, a computer-based tool may be provided. The computer-based tool may include non-transitory computer readable media having stored thereon computer code which, when executed by a processor, causes a computing device to perform operations that include receiving data associated with a structured proceeding involving at least one party, the data including at least one docket entry, analyzing, by an outcome location detector, the data to identify one or more docket entries in the at least one docket entry that are likely to include evidence of an outcome, and analyzing, by an outcome detector, the one or more docket entries determined to be likely to include evidence of an outcome to determine at least one of: a final outcome and at least one party outcome. The final outcome is associated with the structured proceeding overall, and the at least one party outcome is associated with a party of the at least one party.

The foregoing broadly outlines the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Various features and advantageous details are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure.

Figure 1:
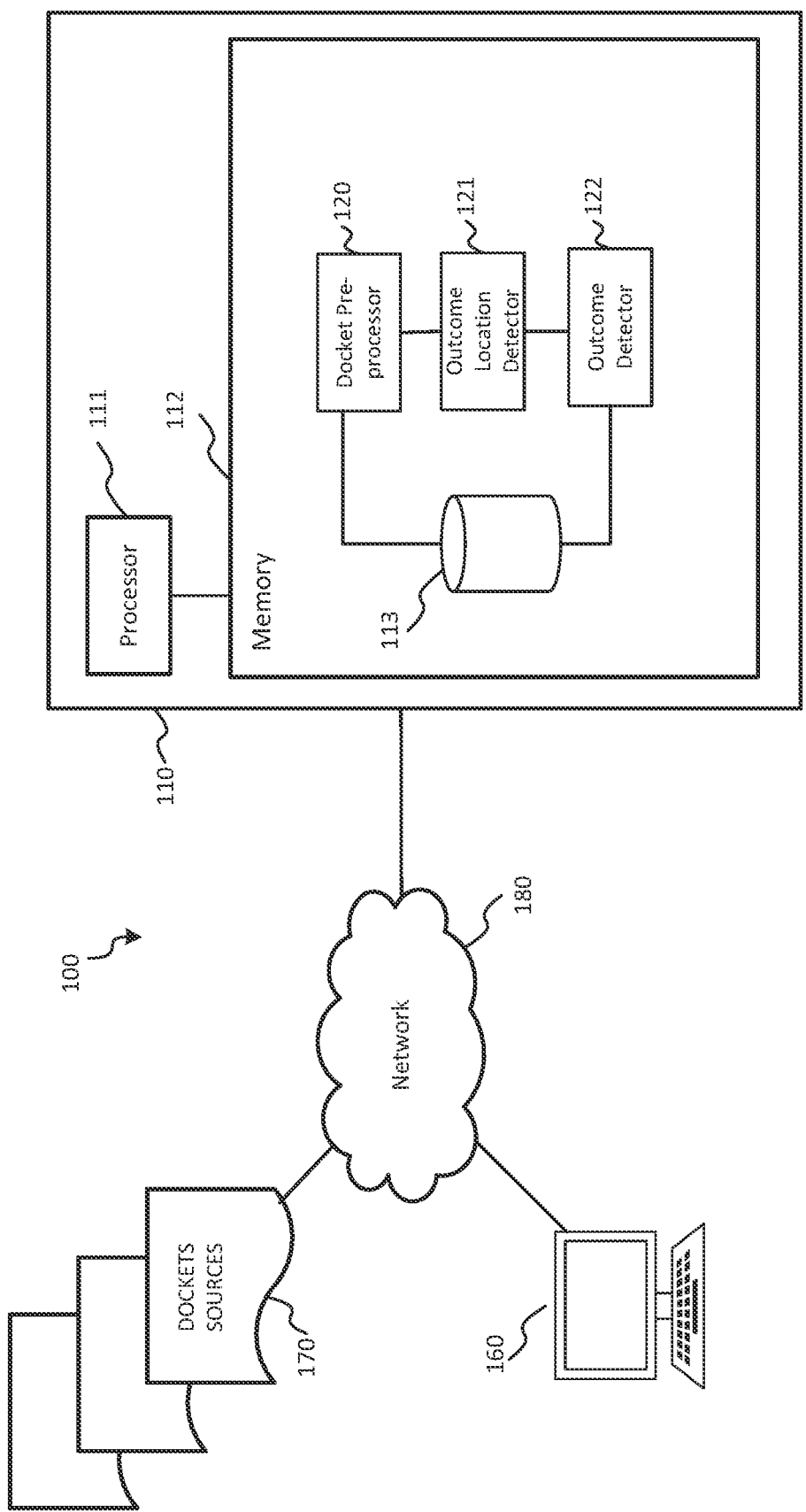
FIG. 1 shows a system configured to perform operations in accordance with embodiments of the present disclosure.

FIG. 1 is a block diagram of an exemplary system 100 configured with capabilities and functionality for analyzing and extracting data related to a structured proceeding, and for identifying, based on the analysis, at least one outcome associated with the structured proceeding. In aspects, as noted above, the structured proceeding may be related to court cases, and the data related to the court cases may include docket entries. In some embodiments, the data (e.g., documents, and/or other information) in the docket entries may be analyzed and extracted to determine a final outcome of the docket, and/or at least one party outcome. As noted above, the analysis involves a robust machine learning based approach that provides a high level of accuracy and flexibility as will be discussed below.

As shown in FIG. 1, system 100 includes server 110, at least one user terminal 160, dockets sources 170, and network 180. These components, and their individual components, may cooperatively operate to provide functionality in accordance with the discussion herein. For example, in operation according to embodiments, docket entries for particular dockets may be obtained from dockets sources 170 and may be provided as input to server 110. The various components of server 110 may cooperatively operate to analyze the data in the docket entries, which may include documents and/or other information, and may extract and may apply customized machine learning algorithms and classifiers to identify a final outcome and/or at least one party outcome. In some aspects, the identified outcomes may be provided to a user, or may be stored in a database for subsequent retrieval.

The functional blocks, and components thereof, of system 100 of embodiments of the present invention may be implemented using processors, electronics devices, hardware devices, electronics components, logical circuits, memories, software codes, firmware codes, etc., or any combination thereof. For example, one or more functional blocks, or some portion thereof, may be implemented as discrete gate or transistor logic, discrete hardware components, or combinations thereof configured to provide logic for performing the functions described herein. Additionally or alternatively, when implemented in software, one or more of the functional blocks, or some portion thereof, may comprise code segments operable upon a processor to provide logic for preforming the functions described herein.

It is also noted that various components of system 100 are illustrated as single and separate components. However, it will be appreciated that each of the various illustrated components may be implemented as a single component (e.g., a single application, server module, etc.), may be functional components of a single component, or the functionality of these various components may be distributed over multiple devices/components. In such aspects, the functionality of each respective component may be aggregated from the functionality of multiple modules residing in a single, or in multiple devices.

In some aspects, server 110, user terminal 160, and dockets sources 170 may be communicatively coupled via network 180. Network 180 may include a wired network, a wireless communication network, a cellular network, a cable transmission system, a Local Area Network (LAN), a Wireless LAN (WLAN), a Metropolitan Area Network (MAN), a Wide Area Network (WAN), the Internet, the Public Switched Telephone Network (PSTN), etc., that may be configured to facilitate communications between user terminal 160 and server 110.

User terminal 160 may be implemented as a mobile device, a smartphone, a tablet computing device, a personal computing device, a laptop computing device, a desktop computing device, a computer system of a vehicle, a personal digital assistant (PDA), a smart watch, another type of wired and/or wireless computing device, or any part thereof. User terminal 160 may be configured to provide a graphical user interface (GUI) via which a user may be provided with information related to outcomes associated with a docket or dockets, such as a docket final outcomes and/or party outcomes.

Docket sources 170 may comprise at least one source of docket related data. Docket related data may include any data related to events and/or actions, such as motions, hearings, filings, decisions, etc., that occur during court proceedings. The information related to a particular court proceeding may be structured as a docket, and may include docket entries. In some cases, a docket entry may include information related to an event, or more than one event, in the court proceeding. The data for the various docket entries may include documents, text, data streams, metadata, etc. It is noted that in the present disclosure, the data for the various docket entries of a particular docket may be referred to as a docket. In aspects, the dockets of docket sources 170 may be received from court systems, and/or may be received from an external database or system, such as the public access to court electronic records (PACER) service.

Server 110 may be configured to receive docket related data (e.g., docket entries) from dockets sources 170, to apply customized machine learning algorithms and classifiers to the data, and to identify at least one outcome associated with the docket from the data. This functionality of server 110 may be provided by the cooperative operation of various components of server 110, as will be described in more detail below. Although FIG. 1 shows a single server 110, it will be appreciated that server 110 and its individual functional blocks may be implemented as a single device or may be distributed over multiple devices having their own processing resources, whose aggregate functionality may be configured to perform operations in accordance with the present disclosure. In some embodiments, server 110 may be implemented, wholly or in part, on an on-site system, or on a cloud-based system.

As shown in FIG. 1, server 110 includes processor 111, memory 112, database 113, docket pre-processor 120, outcome location detector 121, and outcome detector 122. It is noted that the various components of server 110 are illustrated as single and separate components in FIG. 1. However, it will be appreciated that each of the various components of server 110 may be a single component (e.g., a single application, server module, etc.), may be functional components of a same component, or the functionality may be distributed over multiple devices/components. In such aspects, the functionality of each respective component may be aggregated from the functionality of multiple modules residing in a single, or in multiple devices.

In some aspects, processor 111 may comprise a processor, a microprocessor, a controller, a microcontroller, a plurality of microprocessors, an application-specific integrated circuit (ASIC), an application-specific standard product (ASSP), or any combination thereof, and may be configured to execute instructions to perform operations in accordance with the disclosure herein. In some aspects, implementations of processor 111 may comprise code segments (e.g., software, firmware, and/or hardware logic) executable in hardware, such as a processor, to perform the tasks and functions described herein. In yet other aspects, processor 111 may be implemented as a combination of hardware and software. Processor 111 may be communicatively coupled to memory 112.

Memory 112 may comprise read only memory (ROM) devices, random access memory (RAM) devices, one or more hard disk drives (HDDs), flash memory devices, solid state drives (SSDs), other devices configured to store data in a persistent or non-persistent state, network memory, cloud memory, local memory, or a combination of different memory devices. Memory 112 may store instructions that, when executed by processor 111, cause processor 111 to perform operations in accordance with the present disclosure.

In aspects, memory 112 may also be configured to facilitate storage operations. For example, memory 112 may comprise database 113 for storing analysis data, models, classifiers, rankers, usage metrics, analytics, user preferences, identified final outcomes, identified party outcomes, etc., which system 100 may use to provide the features discussed herein. Database 113 may be integrated into memory 112, or may be provided as a separate module. In some aspects, database 113 may be a single database, or may be a distributed database implemented over a plurality of database modules. In some embodiments, database 113 may be provided as a module external to server 110.

Figure 2:
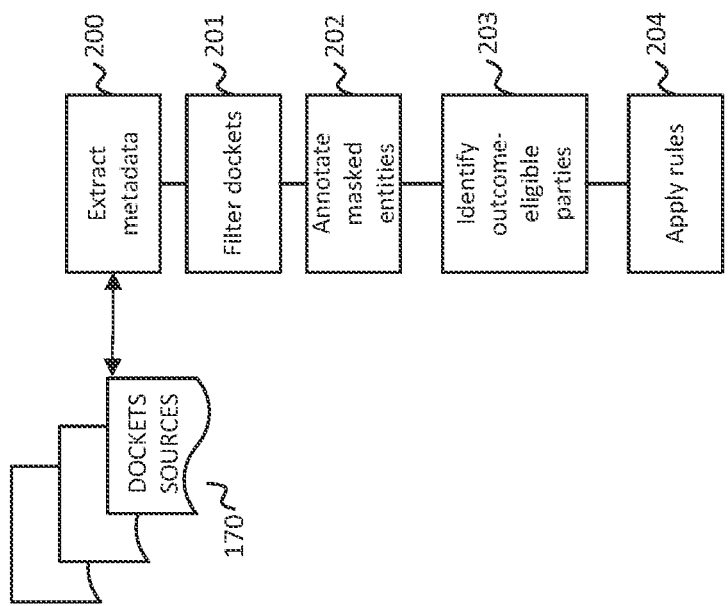
FIG. 2 shows a flow diagram illustrating functionality of an outcome location detector implemented in accordance with aspects of the present disclosure.

Docket pre-processor 120 may be configured to process docket data received from dockets sources 170 in order to condition the docket data for subsequent analysis. The functionality of docket pre-processor 120 will now be discussed with respect to the block diagram illustrated in FIG. 2. FIG. 2 shows a flow diagram illustrating functionality of docket pre-processor 120 for analyzing and processing docket data in order to condition the docket data for subsequent analysis. At block 200, metadata is extracted from the docket data. In aspects, the metadata extracted may include case numbers, flags, names, roles, dates, time spans, numbers, money amounts, references to other cases, references to other docket entries, filing dates, and/or closed dates associated with the case. In aspects, the filing dates and/or closed dates may be correlated to the various docket entries in the docket data. The metadata extracted may also include indications as to whether a particular docket includes any docket entries, and or includes associated parties. In aspects, the parties associated with the case related to the docket may also be identified by the metadata.

At block 201, the docket data is filtered. In aspects, filtering the docket data may include identifying and filtering out dockets that should not receive outcomes. These dockets that should not receive outcomes may include dockets do not include any docket entries, and/or that do not include any associated parties. In aspects, identifying dockets to be filtered out may include checking a flag and or field in the docket data indicating whether there any docket entries, and/or parties in the docket, or may be based on the metadata extracted at block 200. In some aspects, dockets for cases related to prisoner rights, social security, unemployment, disability reviews, and other cases in which sensitive and/or confidential information is handled may be excluded and filtered out. In embodiments, multidistrict litigation (MDL) cases may be filtered out. Identifying MDL cases may include an MDL detector in which a case number lookup may be performed against a list of known MDL docket numbers that may be extracted from member cases records maintained by an external system, such as the judicial panel of multidistrict litigation (JPML). The MDL detector may then search for indicative fields in the docket data status flags, and then may apply a rule-based detection on the text of the docket entries. The rule-based detection may search for MDL case numbers and key phrases related to specific actions detailed in the case records obtained from the external system (e.g., JPML).

At block 202, entities (e.g., names and other words/phrases) that may be masked (e.g., normalized) in subsequent steps may be identified. In aspects, the entities may be masked at this point, or may be annotated to be masked at a subsequent point. As noted above, these entities may be identified using regular expression rules. The entities to be masked may include names, parties, attorneys, judges, roles, dates, time spans, deadlines, numbers, money amounts, references to other cases, references to other docket entries, etc. In aspects, parties with multiple roles (e.g., a plaintiff who is also a counter-defendant) may be unified.

At block 203, outcome-eligible parties are identified. In aspects, rules may be used to identify parties that should not receive an outcome, such as fictitious parties. In some aspects, parties associated with a case may be determined to have an insufficient amount of interest in the case, and are thus determined to not be assigned a meaningful outcome. In some implementations, the docket data may include court-provided termination dates identifying parties that left the case before the case was resolved and/or terminated. The termination dates may be used to determine docket entries in the docket associated with the termination events. In aspects, parties with the same termination date, or with a termination date within a threshold amount of days of each other, may be grouped together. In this case, the parties may be determined to have been terminated from the case for the same reason. In embodiments, parties that are part of the final outcome and/or disposition of the case may also be identified.

At block 204, rules may be applied to the docket data to identify particular events in the docket entries and associate them with particular parties. For example, rules may be applied to the text of the docket entries in order to identify dismissals of the case, settlements, and/or events associated with a trial (e.g., jury selection, verdict instructions, trial transcripts, etc.), and to link the event to a particular party. In a particular example, a rule may be applied to a particular docket entry and may define a search for whether party A is mentioned within X number of words of "dismissed." In that case, the rule may link party A with a dismissal event in the particular docket entry. In aspects, these rules may be human-generated.

It is noted that in a particular docket, not all docket entries include an outcome, and/or not all docket entries include evidence and/or information of an outcome, whether a final outcome or a party outcome. With reference back to FIG. 1, outcome location detector 121 may be configured to determine docket entries which are likely to have evidence regarding an outcome associated with the docket. In aspects, outcome location detector 121 may use the closed date associated with the case to determine docket entries that may contain an outcome. For example, outcome location detector 121 may determine that docket entries proximate to the closed date of the case may include evidence of an outcome. In aspects, the proximate docket entries may be determined based on a threshold, where docket entries within threshold days of the closed date may be determined to include evidence of an outcome. In embodiments, a classifier may be applied to the text of individual docket entries to identify docket entries that may contain evidence of an outcome, regardless of the closed date. In aspects, the outcome location detector 121 is a high recall detector, which is configured to provide a large set of results, without considering the precision of the results. The docket entries determined to be likely to have evidence regarding an outcome associated with the docket may be provided to outcome detector 122 for further analysis.

Outcome detector 122 may be configured to determine, based on the docket entries identified by the outcome location identifier, outcomes associated with the docket. In aspects, the outcomes associated with the docket may be least one of a final outcome and at least one party outcome. As noted above, the final outcome may be associated with the docket overall (e.g., a final outcome and/or disposition of the associated case), and the party outcome may be an outcome associated with a particular party. In a sense, outcome detector 122 may determine whether the docket entries that have been determined to be likely to have evidence regarding an outcome associated with the docket, in fact include an outcome. Outcome detector 122 is further configured to identify, when the docket entries in fact include an outcome, the outcome included in the docket entries.

It is noted that, in aspects, the outcomes that may be identified may be based on a hierarchical taxonomy. In a particular example, top-level outcomes may include categories such as dismissal by motion, dismissal without a motion (which may include agreed dismissals), settlement, default judgment, summary judgment, verdict (which may include jury verdicts and judgments from bench trials), and "docketed elsewhere" (which may be a generic, catch-all category for transfer, consolidation, and remand outcomes). In aspects, the verdict category may be further categorized by jury verdicts and judgments at bench trials. Judgment outcomes may further include a direction, such as in favor of plaintiff or in favor of defendant, for judgment outcomes.

Figure 3:
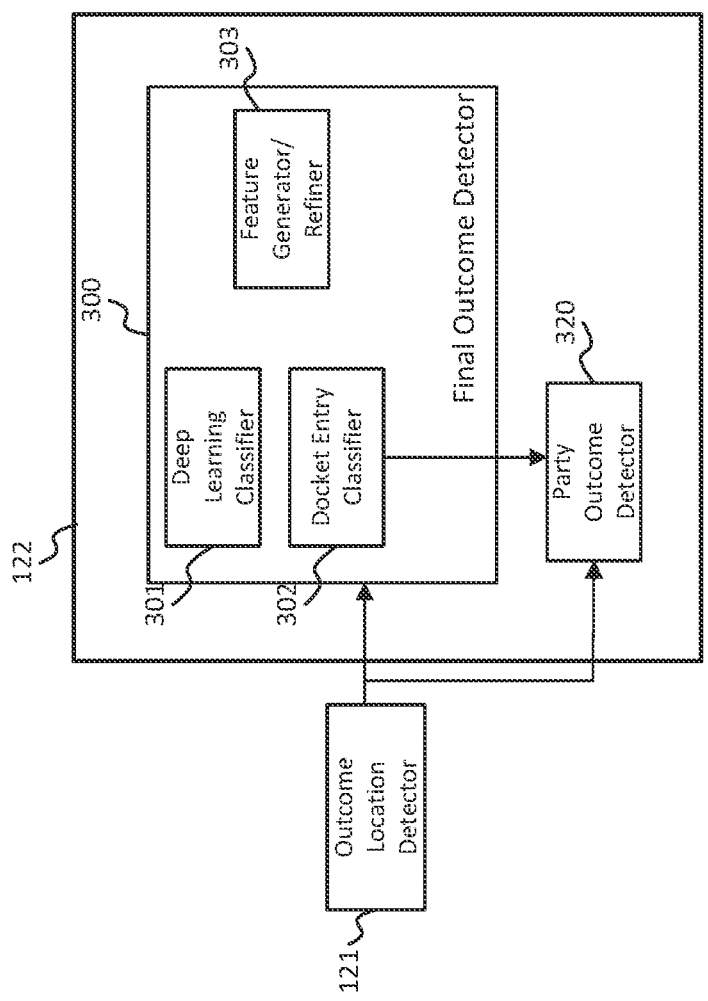
FIG. 3 shows a block diagram illustrating functionality of an outcome detector for determining outcomes associated with a docket in accordance with aspects of the present disclosure.

In aspects, the functionality of outcome detector 122 to determine outcomes associated with the docket may include functionality provided by a final outcome detector and a party outcome detector, as shown in FIG. 3. FIG. 3 shows a block diagram illustrating functionality of an outcome detector for for determining outcomes associated with a docket in accordance with aspects of the present disclosure. As shown, outcome detector 122 may include final outcome detector 300 and party outcome detector 320.

Final outcome detector 300 may be configured to determine, based on the docket entries of a docket, whether a final outcome may be included, and what the final outcome may be. It is noted at this time that identifying and/or determining a final outcome of a docket may typically be a challenging proposition. For example, decisions and verdicts may be appealed or drawn out with post-trial motions. Even in cases where an appeal may affirm the decision, there may be numerous docket entries after the outcome point (e.g., the docket entry or portion of the docket entry in which the decision was affirmed) that may not provide meaningful information with respect to the outcome. In cases where an appeal may reverse the decision or verdict, outcome events that may have occupied a great deal of the courts attention (e.g., jury trial) may be supplanted by a dismissal in a single docket entry. As an additional example, very few settlement agreements may be put on the record, and figuring out that a case was settled may involve a careful analysis of the language and text of the docket entries. Thus, as can be seen, identifying a final outcome of a docket may involve analysis of significantly more than a single docket entry. Various aspects of the present disclosure provide functionality to analyze and reason through the sequence of events in a case docket and are able to identify the final outcome of the case.

The functionality of final outcome detector 300 may include deep learning classifier 301, docket entry classifier 302, and feature generator/refiner 303. It is noted that the various components of final outcome detector 300 are illustrated as single and separate components. However, it will be appreciated that each of the various illustrated components may be implemented as a single component, as functional components of a single component, or may be distributed over multiple devices/components. In such aspects, the functionality of each respective component may be aggregated from the functionality of multiple modules residing in a single, or in multiple devices.

In aspects, docket entry classifier 302 may be configured to apply machine learning algorithms to the docket entries in order to identify the most likely outcome included in the docket entries. It is noted that, as used herein, a docket outcome may refer to a prediction of an outcome that may apply to the docket overall regardless of the docket entry in which the docket outcome is included, and a docket entry outcome may refer to an outcome that may apply to the docket entry even if the docket entry may or may not be a docket outcome.

In aspects, docket entry classifier 302 may predict whether a docket entry includes an outcome. The outcome identified by docket entry classifier 302 for a particular docket entry may be specific to the docket entry and may not consider the outcomes in other entries. For example, a first docket entry may include a summary judgment outcome, but a subsequent docket entry may include an outcome overturning the summary judgment. In this case, docket entry classifier 302 may identify the summary judgment outcome and associate it with the first docket entry without considering the reversal in the subsequent docket entry. In other aspects, docket entry classifier 302 may presume a docket entry includes an outcome and based on that, may determine what the most likely outcome in the docket entry may be. In aspects, docket entry classifier 302 presumes and/or identifies a single most likely outcome for each of the various docket entries.

In aspects, docket entry classifier 302 may be configured to predict the outcome associated with each docket entry of a docket. In one particular implementation, conditional random fields (CRF) and bi-directional long short-term memory (LSTM) CRF deep neural network may be used for sequence tagging. In another implementation, support vector machines (SVMs) may be used to determine and/or predict an outcome associated with a docket entry. This particular approach has been found to work very well in situations where annotated data for classifier training may be limited. In aspects, using SVMs may include encoding docket entries as fixed dimensional vectors. This encoding may be done using various word embedding approaches (e.g., GLOVE (global vectors for word representation), FastText, etc.). In these implementations, matrix factorization may be used to capture semantic and syntactic attributes of words in dense vectors, and in some cases, sub-word morphology may be leverage to allow vectoral representations of as-yet unseen words. In some aspects, encoding a docket entry as a vector may include averaging the vectors for each word, and may also include limiting the number of words to process (e.g. use only the first 30 tokens or words). This limiting may improve performance, and there may be cases where docket entries may be overly long, although the salient content may typically be found towards the beginning of the docket entry. In other cases, other distance-weighted approaches may be used.

In another implementation, docket entry classifier 302 may be implemented using a term frequency-inverse document frequency (TF-IDF) model. The TF-IDF model may provide an indication of the relevance of each token or word to the docket entry. In aspects, a range of parameters may be optimized including limiting the maximum number of features to use (e.g., limited to a number in the order of thousands), using N-grams (which may provide higher performance than when using unigrams), using lemmatization, removing stop words, smoothing of the IDF weights, using sublinear term frequency scaling, and employing regularizer choice (e.g., using 12-norm). In some aspects, domain specific features may be used, such as binary encodings for the presence or absence of different party types, links, etc.

Deep learning classifier 301 may be configured to apply machine learning algorithms to the docket entries in order to identify any outcome present in the docket entries, which may include docket outcomes and/or docket entry outcomes. In aspects, deep learning classifier 301 may determine outcomes included in the docket entries without necessarily associating the outcomes to a particular position and/or docket entry in the docket. In this sense, deep learning classifier 301 may operate at the top level of the docket taxonomy. In another embodiment, deep learning classifier 301 may determine an outcome for a particular docket entry based on applying the machine learning algorithms to the docket entry and also based on outcomes of other docket entries in the docket. Thus, deep learning classifier 301 may determine an outcome for a docket entry based on the data in the docket entry, and additionally based on the outcome determined for other docket entries based on the data of the other docket entries. In aspects, deep learning classifier 301 may determine an outcome, and may also determine the position of the outcome within the docket and/or docket entry. The position may then be fed back to the deep learning model to determine what the outcome should be.

Figure 5:
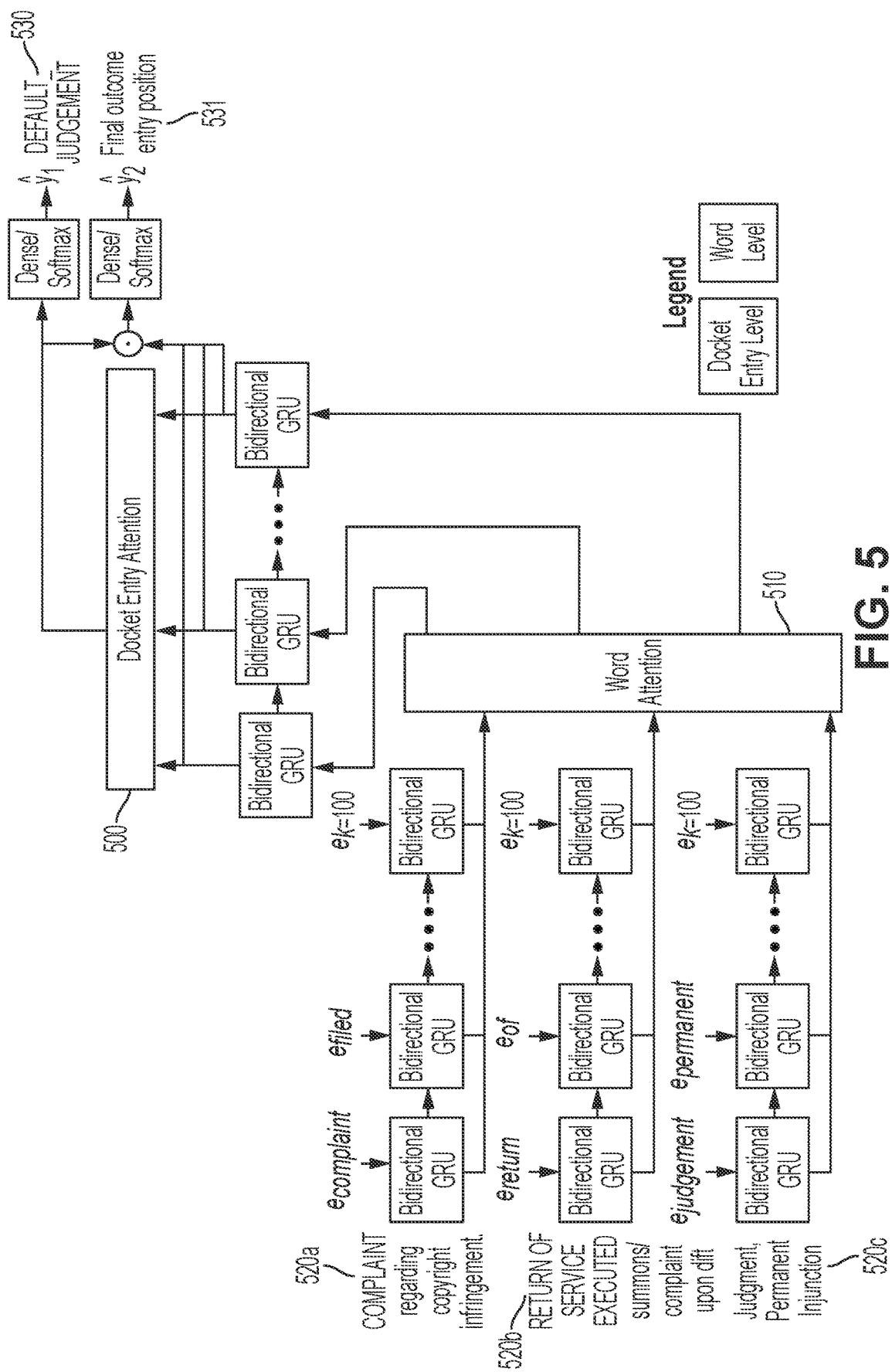
FIG. 5 shows a block diagram illustrating an example of a hierarchical attention network process for determining a final outcomes and final outcome positions.

In a particular implementation, deep learning classifier 301 may use a hierarchical attention network approach in which word level determinations are made with respect to an outcome prediction. For example, the words of the docket entry may be analyzed and classified into an outcome prediction. In addition, docket entry level determinations may then be made. For example, the docket entries may be fed into the classification model or models to determine an outcome prediction based on the docket entries. The outcome prediction may be determined by generating a prediction score for each target outcome class. In aspects, the resulting outcome class with the highest score may be determined to be the prediction outcome. In some embodiments, the outcome prediction may include a location of the predicted outcome within the docket (e.g., the docket entry in which the predicted outcome occurs). The outcome prediction location, along with the predicted outcome may be jointly learned. FIG. 5 shows an example of a hierarchical attention network process for inferring final outcome and final outcome position used by deep learning classifier 301.

It is noted that using a hierarchical attention network approach may allow deep learning classifier 301 to directly learn from the final docket outcomes, rather than from the docket entry outcome labels. In some cases, there may be insufficient information in an individual docket entry to determine whether an entry indicates an overall and/or final outcome of the case. In these cases, global information may be useful. This approach provides for a mechanism to determine docket outcomes and docket entry outcomes using an end-to-end model [e.g., docket entries→docket outcome] rather than having separate models whereby learned encodings using docket entry labels may be fed to a second neural network used to predict the docket outcome.

As shown in FIG. 5, each word token of docket entries 520a-c may be fed into a corresponding word-level recurrent neural network (RNN) (e.g., a bidirectional gated recurrent unit (GRU)). The output of each corresponding word-level RNN may be fed into an attention layer (e.g., word-level attention layer 510) to encode the docket entries. The encoding of the docket entries may then be fed into another RNN, and subsequently fed into an attention layer (e.g., docket entry-level attention layer 500) to produce an encoding of the entire docket. A dense layer with softmax activation may then be used to determine outcome prediction 530. The final outcome location prediction 531 may be determined by combining the output and input of docket entry-level attention layer 500 and feeding the combination into the dense layer with softmax activation. In some implementations, the combination of the input and output of docket entry-level attention layer 500 may include an element-wise multiplication.

In some embodiments, deep learning classifier 301 may be implemented using a convolutional layer that may be applied at the level of docket entries or at the level of words with all docket entries concatenated. For example, deep learning classifier 301 may use models that may use TF-IDF scores of the words in the docket entries or word embeddings as features to be fed into the model to determine the outcomes. In some aspects, TF-IDF scores may be computed based upon training dockets, while for word embeddings, the scores may be obtained by applying shallow models, such as word2vec, to the docket entries. In some aspects, additional features to discussed below, the output of the models of deep learning classifier 301 may be used to predict the docket outcomes, as well as to predict the outcomes of docket entries, in some cases using a single multi-task model. It is noted that models used by deep learning classifier 301 may include single-task-single-input models, multi-task-single-input models, and multi-task-multi-input models, as discussed in more detail below.

One particular model used by deep learning classifier 301 may include a single-task-single-input model. In this implementation, the docket entries may be vectorized to generate TF-IDF scores or word embeddings. The vectorized data may then be input into the single-task-single-input model to determine and/or predict outcome(s) for each docket. In aspects, before the outcome(s) may be predicted, the vectorized data may be sent to a convolutional layer and a max-pooling layer, and the intermediate results from the max-pooling layer may then be sent to a GRU layer. In aspects, the GRU output may be processed by a dense layer with softmax or sigmoid activation in order to determine the outcome(s). In other aspects, the vectorized input may be sent directly to a series of GRU layers, and then to a series of dense layers. The docket outcome(s) prediction may be derived by applying softmax or sigmoid activation to the last dense layer of the series of dense layers.

Another model used by deep learning classifier 301 may include a multi-task-single-input model. In this implementation, a single model may be used to perform docket entry outcome predictions and docket outcome predictions. In this approach, the vectorized input, as discussed above, may be fed into a shared GRU layer, and the output of the shared GRU layer may be split into a docket outcome prediction branch, which may follow the same procedure as the single-task-single-input model approach discussed above, and a docket entry outcome prediction branch, in which stacked GRU layers and a final dense layer that may be wrapped by a TimeDistributed layer may be used. In aspects, the TimeDistributed layer may allow generating a prediction on every single docket entry of a given docket.

Another model used by deep learning classifier 301 may include a multi-task-multi-input model. In this approach, additional inputs, such as SVM scores, Lex features, etc., in addition to the vectorized input discussed above, may be used. In addition, in a multi-task-multi-input model approach, three tasks may be performed: docket outcomes prediction, docket entry outcomes prediction, and docket final outcome prediction. As used herein, docket final outcome may refer to the ultimate outcome or disposition of the case associated with the docket.

In another embodiment, a recursive neural networks may be used by deep learning classifier 301. In this embodiment, a recursive neural network may be applied at the level of words in the various docket entries, and another recursive neural network may be applied at the level of docket entries, forming a nested structure. As with the hierarchical attention network described above, using nested recursive neural networks may allow deep learning classifier 301 to directly learn from the final docket outcomes, rather than from the docket entry outcome labels. As such, the nested recursive neural networks approach provides for a mechanism to determine docket outcomes and docket entry outcomes using an end-to-end model rather than having separate models whereby learned encodings of sequence of entries may be fed to a second neural network used to predict the docket outcome.

Figure 4:
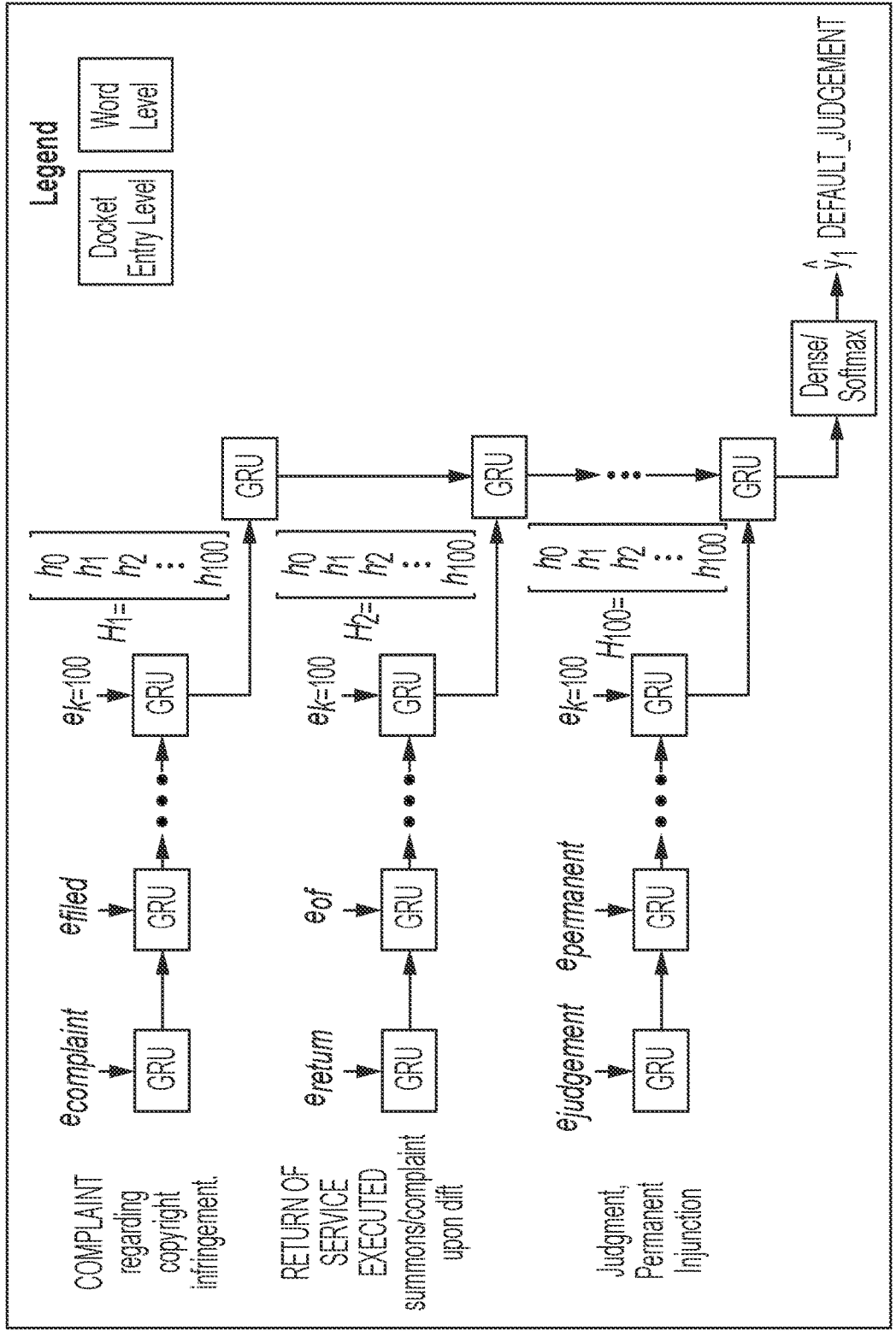
FIG. 4 shows a block diagram illustrating an example of a nested neural networks process for outcome determination.

The nested recursive neural networks of deep learning classifier 301 may be implemented by applying an RNN, e.g., a GRU, on word level embedding for each docket entry. The resulting encoding for each docket entry may then be applied to another RNN, producing an encoding for the entire docket. The document encoding may then be fed to a fully-connected network with softmax activation to produce a probability score for each outcome. FIG. 4 shows an example of a nested neural networks approach used by deep learning classifier 301.

In aspects, saliency maps may be used to approximate how each docket entry and word may contribute to a prediction score for each target class (e.g., target outcome class). Under this approach, deep learning classifier 301 may be aware of typical entries/words for a given class (e.g., a particular outcome). Saliency maps, used independently or combined with attention weights may be used for providing clues to users on which entries may be "important."

The nested recursive neural networks and/or the hierarchical attention network approaches used by deep learning classifier 301 may include, in some embodiments, operations in which un-normalized saliencies may be computed for each test sample and for each target class (e.g., target label or target outcome category). Computing un-normalized saliencies may allow identification of the top K examples (e.g., top K salient examples) for particular target classes. The top K examples may be used to determine to be the typical entries/words for a given class.

Feature generator/refiner 303 may be configured to extract features from the docket entry outcome predictions of the docket entry classifier 302, and in some cases also from the docket predictions of deep learning classifier 301, and to feed the extracted features into a final outcome classifier for identifying a final outcome. In this sense, the final outcome classifier may combine features obtained from the various outcome predictions from the classifiers. In particular, as noted above, the docket entry outcome predictions from docket entry classifier 302 may be made individually, without conditioning the predictions on other docket entries. In this case, the final outcome classifier may be used to consider the conditional relationships between the various docket entries in predicting a final outcome from the individual docket entry outcomes.

In embodiments, the final outcome classifier may include a gradient-boosted decision tree that may be used to predict the final outcome. In aspects, during training operations, the gradient-boosted decision tree may be trained using annotated data, such as annotated data received from docket sources 170, and/or annotated data output from docket pre-processor 120. In aspects, rules (e.g., human-written rules) may be applied by feature generator/refiner 303 to highlight the distinction between various outcomes. For example, rules may be applied to differentiate between settlements and dismissals without a motion, both of which may not necessarily be explicitly stated in a docket entry. The final outcome may also be localized, which may include explicitly attaching the final outcome to a docket entry that includes evidence for the final outcome. In aspects, the final outcome may be further refined by adding a direction to the final outcome. For example, a direction may be added to judgment outcomes, such as in favor of plaintiff or in favor of defendant.

In some embodiments, a particular docket may include an outcome indication. For example, the docket may include an indication that the associated case included a jury or bench verdict outcome. In this case, the outcome indication may be substituted for the predicted final outcome. In some cases, for specific types of outcome indications in the docket (e.g., when the docket indicates an outcome other than a verdict outcome), the highest-scoring predicted final outcome from feature generator/refiner 303 that is within the outcome bounds of the indicated outcome may be used instead. In aspects, the outcome bounds may be based upon a threshold prediction score, wherein a predicted final outcome having a score higher than the threshold for the particular outcome class may be said to be within the outcome bounds of the particular outcome class.

Party outcome detector 320 may be configured to apply machine learning algorithms in order to identify party outcomes. In aspects, the functionality of party outcome detector 320 may include functionality to determine parties that were terminated earlier (e.g., prior to the final disposition of the case associated with the docket). In some cases, early termination dates may be provided in the docket (e.g., annotated in the metadata). In these cases, early terminated parties may be identified using the early termination dates. In other aspects, the early terminated parties may be determined by identifying docket entries which include evidence of a party outcome (e.g., evidence that indicates a likelihood that a party was terminated in the docket entry), and then correlating the docket entries to the associated parties. Determining docket entries in which a party was most likely terminated may be performed in accordance with the functionality of docket entry classifier 302, as discussed above. Typically, early terminations tend to be procedurally straightforward (e.g., dismissal, default judgment, summary judgment, or settlement), and the full scope of information to determine the outcome may be found in a single docket entry.

In aspects, docket entry classifier 302 may identify, for each docket entry that is likely to include evidence of an outcome, the outcome included in the docket entry. Party outcome detector 320 may use the information from docket entry classifier 302, apply it to a model, and determine the likelihood that a particular party was terminated by the outcome in the docket entry. In aspects, based on the probability from the model of party outcome detector 320, a particular outcome may be assigned to the particular party as a party outcome. For example, when the probability exceeds a predetermined threshold, the associated party may be determined to be terminated by the outcome associated with the probability.

It is noted at this point that docket entry classifier 302 is illustrated as part of final outcome detector 300. However, in some implementations, docket entry classifier 302 may be part of party outcome detector 320, may be a module separate from both final outcome detector 300 and party outcome detector 320, may be a module shared by both final outcome detector 300 and party outcome detector 320, or may duplicated in both final outcome detector 300 and party outcome detector 320. Thus, the illustration of docket entry classifier 302 as part of final outcome detector 300 should not be construed as limiting in any way.

Figure 6:
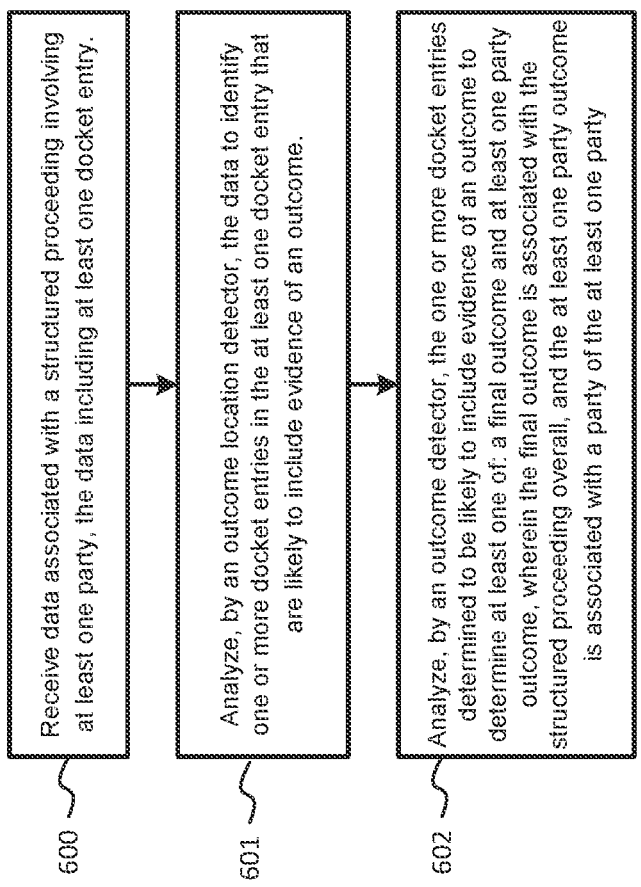
FIG. 6 shows an operational flow diagram illustrating example blocks executed to implement aspects of the present disclosure.

FIG. 6 shows a high level flow diagram of operation of a system configured in accordance with aspects of the present disclosure for analyzing and extracting data related to a structured proceeding, and for identifying, based on the analysis, at least one outcome associated with the structured proceeding. The functions illustrated in the example blocks shown in FIG. 6 may be performed by system 100 of FIG. 1 according to embodiments herein.

At block 600, data associated with a structured proceeding involving at least one party is received. In aspects, the data received may be docket data and may be received from a docket source, such as from dockets sources 170. The docket data may include at least one docket entry, and the at least one docket entry may include information on at least one event. In some aspects, the docket data may be pre-processed such as by extracting metadata, filtering dockets, annotating masked entities, identifying outcome-eligible parties, and applying rules to identify particular events in the docket entries and associate them with particular parties.

At block 601, the data received at block 600 may be analyzed to identify one or more docket entries that are likely to include evidence of an outcome. In aspects, the data may be analyzed using an outcome location detector, such as outcome location detector 121 of FIG. 1. Analyzing the data to identify one or more docket entries that are likely to include evidence of an outcome may include identifying a closed date of the case associated with the docket, and determining that docket entries proximate to the closed date of the case may include evidence of an outcome. In other embodiments, a classifier may be applied to the text of individual docket entries to identify docket entries that may contain evidence of an outcome, regardless of the closed date. In aspects, the docket entries determined to be likely to have evidence regarding an outcome associated with the docket may be provided to an outcome detector for further analysis.

At block 602, the one or more docket entries determined to be likely to include evidence of an outcome are analyzed to determine at least one of a final outcome and at least one party outcome. In aspects, the data may be analyzed using an outcome detector, such as outcome detector 122 of FIG. 1. The final outcome may be associated with the structured proceeding overall, and the at least one party outcome may be associated with a party of the at least one party.

In aspects, analyzing the one or more docket entries may include analyzing the one or more docket entries individually. The individual analysis of the one or more docket entries may be performed by a docket entry classifier of the outcome detector. Analyzing the one or more docket entries may further include determining whether individual docket entries include an individual outcome that is associated with a respective individual docket entry. Additionally, analyzing the one or more docket entries may include identifying the individual outcome associated with the respective individual docket entry. In aspects, identifying the individual outcome associated with the respective individual docket entry may be performed without considering other docket entries of the at least one docket entry or the one or more docket entries that are likely to include evidence of an outcome. The individual outcome associated with the respective individual docket entry may be referred to as a docket entry outcome.

In some aspects, analyzing the one or more docket entries may include analyzing the one or more docket entries and then determining whether individual docket entries of the one or more docket entries include a docket outcome. The analysis of the one or more docket entries may be performed by a deep learning classifier of the outcome detector. The analysis may also include identifying the final outcome based on the individual docket entries and at least one other individual outcome identified in another individual docket entry of the one or more docket entries. In this sense, the determination of the final outcome may be based not only on the information in an individual docket entry, but also on the information in other docket entries. This approach provides a more robust solution, as it may facilitate handling situations in which particular events may be reversed, set aside, or otherwise abrogated by subsequent events.

In embodiments, analyzing the one or more docket entries determined to be likely to include evidence of an outcome to determine the final outcome may include extracting features from the one or more docket entries based on the analysis of the docket entry classifier and the deep learning classifier, and feeding the features to a refiner classifier. The refiner classifier may identify the final outcome based on the features extracted from the one or more docket entries In aspects, analyzing the one or more docket entries determined to be likely to include evidence of an outcome to determine the at least one party outcome associated with the party may include determining, by a party outcome detector, that the party was terminated prior to the final outcome of the structured proceeding. Determining that the party was terminated prior to the final outcome of the structured proceeding may include calculating a probability that the determination that the party was terminated prior to the final outcome is accurate, determining at least one docket entry associated with the termination of the party, determining a docket entry outcome included in the associated at least one docket entry, and assigning a party outcome to the party based on the outcome included in the at least one entry Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

Functional blocks and modules in FIGS. 1-6 may comprise processors, electronics devices, hardware devices, electronics components, logical circuits, memories, software codes, firmware codes, etc., or any combination thereof. Consistent with the foregoing, various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal, base station, a sensor, or any other communication device. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method, performed by a deep learning classifier, for identifying an outcome of a structured proceeding, the method comprising:
receiving, at a first level of a neural network of the deep learning classifier, a first word token corresponding to a first word of a first entry of the structured proceeding;
receiving, at the first level of the neural network, a second word token corresponding to a first word of a second entry of the structured proceeding, wherein the first level of the neural network comprises a first plurality of bidirectional gated recurrent units (GRUs) and a second plurality of GRUs;
outputting, by the first plurality of GRUs, a first encoded entry corresponding to the first entry of the structured proceeding;
outputting, by the second plurality of GRUs, a second encoded entry corresponding to the second entry of the structured proceeding;
receiving, at a second level of the neural network of the deep learning classifier, the first encoded entry and the second encoded entry, wherein:
the second level of the neural network includes a third plurality of GRUs,
a first GRU of the third plurality of GRUs is coupled to the first plurality of GRUs and is configured to receive the first encoded entry, and
a second GRU of the third plurality of GRUs is coupled to the second plurality of GRUs and is configured to receive the second encoded entry; and
outputting, by the second level of the neural network, an encoded structured proceeding corresponding to the structured proceeding;
receiving, by a third level of the neural network of the deep learning classifier, the encoded structured proceeding; and
outputting, by the third level of the neural network, a probability score associated with an outcome corresponding to the encoded structured proceeding.

2. The method of claim 1, wherein:
the first plurality of GRUs comprises at least a first bidirectional gated recurrent unit (GRU) and a second GRU, and
the second plurality of GRUs comprises at least a third GRU and a fourth GRU.

3. The method of claim 2, wherein:
a first GRU of the first plurality of GRUs is configured to receive the first word token,
a second GRU of the second GRU plurality of GRUs is configured to receive the second word token,
a third GRU of the third plurality of GRUs is configured to receive the first encoded entry, and
a fourth GRU of the third plurality of GRUs is configured to receive the second encoded entry.

4. The method of claim 1, wherein the third level of the neural network comprises a softmax activation layer.

5. The method of claim 1, wherein:
receiving, at the first level of the neural network of the deep learning classifier, the first word token comprises receiving, at the first level of the neural network, a first plurality of word tokens, wherein the first word token is included in the first plurality of word tokens; and
receiving, at the first level of the neural network, the second word token comprises receiving, at the first level of the neural network, a second plurality of word tokens, wherein the second word token is included in the second plurality of word tokens.

6. The method of claim 5, wherein the first plurality of word tokens are provided to the first plurality of GRUs, and wherein the second plurality of word tokens are provided to the second plurality of GRUs.

7. The method of claim 5, wherein the second level of the neural network comprises a third plurality of GRUs, each GRU of which is configured to receive an encoded entry of the structured proceeding.

8. The method of claim 1, wherein:
the structured proceeding comprises a docket, the first entry comprises a first docket entry,
and
the second entry comprises a second docket entry.

9. The method of claim 8, wherein:
the first word of the first entry corresponds to a first word of the first docket entry, and
the first word of the second entry corresponds to a first word of the second docket entry.

10. An apparatus configured to identify an outcome of a structured proceeding, the apparatus comprising:
a processor;
a memory coupled to the processor, wherein the memory comprises a deep learning classifier, and wherein the deep learning classifier is configured to:
receive, at a first level of a neural network of the deep learning classifier, a first word token corresponding to a first word of a first entry of the structured proceeding;
receive, at the first level of the neural network, a second word token corresponding to a first word of a second entry of the structured proceeding, wherein the first level of the neural network comprises a first plurality of bidirectional gated recurrent units (GRUs) and a second plurality of GRUs;
output, by the first plurality of GRUs, a first encoded entry corresponding to the first entry of the structured proceeding;
output, by the second plurality of GRUs, a second encoded entry corresponding to the second entry of the structured proceeding;
receive, at a second level of the neural network of the deep learning classifier, the first encoded entry and the second encoded entry, wherein:
the second level of the neural network includes a third plurality of GRUs, a first GRU of the third plurality of GRUs is coupled to the first plurality of GRUs and is configured to receive the first encoded entry, and
a second GRU of the third plurality of GRUs is coupled to the second plurality of GRUs and is configured to receive the second encoded entry; and
output, by the second level of the neural network, an encoded structured proceeding corresponding to the structured proceeding;
receive, by a third level of the neural network of the deep learning classifier, the encoded structured proceeding; and
output, by the third level of the neural network, a probability score associated with an outcome corresponding to the encoded structured proceeding.

11. The apparatus of claim 10, wherein:
the first plurality of GRUs comprises at least a first bidirectional gated recurrent unit (GRU) and a second GRU, and
the second plurality of GRUs comprises at least a third GRU and a fourth GRU.

12. The apparatus of claim 11, wherein:
a first GRU of the first plurality of GRUs is configured to receive the first word token,
a second GRU of the second GRU plurality of GRUs is configured to receive the second word token,
a third GRU of the third plurality of GRUs is configured to receive the first encoded entry, and
a fourth GRU of the third plurality of GRUs is configured to receive the second encoded entry.

13. The apparatus of claim 10, wherein the third level of the neural network comprises a softmax activation layer.

14. The apparatus of claim 10, wherein the deep learning classifier configured to receive the first word token and the second word token further comprises the deep learning classifier configured to:
receive, at the first level of the neural network, a first plurality of word tokens, wherein the first word token is included in the first plurality of word tokens, and
receive, at the first level of the neural network, a second plurality of word tokens, wherein the second word token is included in the second plurality of word tokens.

15. The apparatus of claim 14, wherein the first plurality of word tokens are provided to the first plurality of GRUs, and wherein the second plurality of word tokens are provided to the second plurality of GRUs.

16. The apparatus of claim 14, wherein the second level of the neural network comprises a third plurality of GRUs, each GRU of which is configured to receive an encoded entry of the structured proceeding.

17. A non-transitory computer readable medium comprising instructions that, when executed by a processor, cause the processor to:
receive, at a first level of a neural network of a deep learning classifier, a first word token corresponding to a first word of a first entry of a structured proceeding;
receive, at the first level of the neural network, a second word token corresponding to a first word of a second entry of the structured proceeding, wherein the first level of the neural network comprises a first plurality of bidirectional gated recurrent units (GRUs) and a second plurality of GRUs;
output, by the first plurality of GRUs, a first encoded entry corresponding to the first entry of the structured proceeding;
output, by the second plurality of GRUs, a second encoded entry corresponding to the second entry of the structured proceeding;
receive, at a second level of the neural network of the deep learning classifier, the first encoded entry and the second encoded entry, wherein:
the second level of the neural network includes a third plurality of GRUs,
a first GRU of the third plurality of GRUs is coupled to the first plurality of GRUs and is configured to receive the first encoded entry, and
a second GRU of the third plurality of GRUs is coupled to the second plurality of GRUs and is configured to receive the second encoded entry; and
output, by the second level of the neural network, an encoded structured proceeding corresponding to the structured proceeding;
receive, by a third level of the neural network of the deep learning classifier, the encoded structured proceeding; and
output, by the third level of the neural network, a probability score associated with an outcome corresponding to the encoded structured proceeding.

18. The non-transitory computer readable medium of claim 17, wherein:
the first plurality of GRUs comprises at least a first bidirectional gated recurrent unit (GRU) and a second GRU, and
the second plurality of GRUs comprises at least a third GRU and a fourth GRU.

19. The non-transitory computer readable medium of claim 18, wherein:
- a first GRU of the first plurality of GRUs is configured to receive the first word token,
- a second GRU of the second GRU plurality of GRUs is configured to receive the second word token,
- a third GRU of the third plurality of GRUs is configured to receive the first encoded entry, and
- a fourth GRU of the third plurality of GRUs is configured to receive the second encoded entry.

20. The non-transitory computer readable medium of claim 17, wherein the third level of the neural network comprises a softmax activation layer.

* * * * *

UNITED STATES PATENT AND TRADEMARK OFFICE
CERTIFICATE OF CORRECTION

| | |
|---|---|
| PATENT NO. | : 12,008,668 B2 |
| APPLICATION NO. | : 18/102760 |
| DATED | : June 11, 2024 |
| INVENTOR(S) | : Thomas Vacek et al. |

It is certified that error appears in the above-identified patent and that said Letters Patent is hereby corrected as shown below:

In the Specification

At Column 11, Line number 63, insert --be fed into the models may be obtained from the docket entry classifier 302. As will be further-- after "additional features to".

Signed and Sealed this
Thirteenth Day of August, 2024

Katherine Kelly Vidal
*Director of the United States Patent and Trademark Office*